US012791922B2

(12) United States Patent
Flynn

(10) Patent No.: US 12,791,922 B2
(45) Date of Patent: Nov. 10, 2026

(54) PHOTO STUDIO RIG ASSEMBLY

(71) Applicant: Frances Margaret Flynn, New Delhi (IN)

(72) Inventor: Frances Margaret Flynn, New Delhi (IN)

(*) Notice: Subject to any disclaimer, the term of this patent is extended or adjusted under 35 U.S.C. 154(b) by 360 days.

(21) Appl. No.: 18/534,747

(22) Filed: Dec. 11, 2023

(65) Prior Publication Data

US 2025/0189874 A1 Jun. 12, 2025

(51) Int. Cl.

| | |
|---|---|
| ***G03B 17/56*** | (2021.01) |
| ***F16M 11/08*** | (2006.01) |
| ***F16M 11/20*** | (2006.01) |
| ***F16M 11/24*** | (2006.01) |
| ***F16M 11/26*** | (2006.01) |

(52) U.S. Cl.

CPC ........... *G03B 17/561* (2013.01); *F16M 11/08* (2013.01); *F16M 11/2021* (2013.01); *F16M 11/2085* (2013.01); *F16M 11/242* (2013.01); *F16M 11/26* (2013.01); *F16M 2200/027* (2013.01)

(58) Field of Classification Search

None

See application file for complete search history.

(56) References Cited

U.S. PATENT DOCUMENTS

| | | | | |
|---|---|---|---|---|
| 2,325,592 A * | 8/1943 | Degler | A47C 4/02 182/186.3 | |
| 2,410,330 A * | 10/1946 | Ashenfelter | B25H 1/06 182/182.1 | |
| 3,586,278 A * | 6/1971 | Simons | F16M 11/12 396/428 | |
| 4,449,656 A * | 5/1984 | Wouden | B60R 9/045 224/329 | |
| 5,009,337 A * | 4/1991 | Bimbi | B60R 9/00 224/400 | |
| 6,357,710 B1 * | 3/2002 | Fielden | F16M 13/022 248/231.51 | |
| 7,789,356 B1 * | 9/2010 | Jones | F16M 11/16 396/428 | |
| 8,526,802 B1 * | 9/2013 | Starns | G03B 15/02 396/428 | |
| 9,983,464 B1 * | 5/2018 | Kim | F16M 11/10 | |
| 9,989,836 B1 * | 6/2018 | Riddel | F16M 13/00 | |
| 10,744,526 B2 * | 8/2020 | Johnson | B25H 1/00 | |
| 2013/0097058 A1 * | 4/2013 | Baker | G06Q 30/0641 396/3 | |

(Continued)

FOREIGN PATENT DOCUMENTS

| | | | | |
|---|---|---|---|---|
| CN | 221248570 U * | 7/2024 | | |
| KR | 200468697 Y1 * | 9/2013 | B65B 67/00 | |

*Primary Examiner* — Rodney E Fuller

(57) ABSTRACT

A photo studio rig assembly includes a photography accessory holding assembly and a pair of vertically extending support member. The photography accessory holding assembly includes a longitudinally extending horizontal assembly member that may expand or contract, one or more gear assembly member and one or more clamping assembly member. The pair of vertically extending support member is spaced apart from each other to be coupled to the longitudinally extending horizontal assembly member. The one or more gear assembly member and one or more clamping assembly member are adjustably coupled to the longitudinally extending horizontal assembly member.

17 Claims, 8 Drawing Sheets

(56) References Cited

U.S. PATENT DOCUMENTS

| | | | | |
|---|---|---|---|---|
| 2013/0170823 | A1 * | 7/2013 | McDonald ........... | F16M 11/041<br>396/428 |
| 2023/0418132 | A1 * | 12/2023 | Shi ....................... | F16M 11/245 |

* cited by examiner

PHOTO STUDIO RIG ASSEMBLY

FIELD OF THE DISCLOSURE

The present disclosure relates to a photography instruments, and, more specifically, relates to a photo studio rig assembly to be used for the purposes, including, but not limited to, photography, videography, and the like.

BACKGROUND OF THE DISCLOSURE

A photo rig is a necessary instrument for a photographer to perform long-exposure or pursue more stable images. Especially, expert photographers need a photo rig with excellent stability, reliability and operability. Generally, a camera is mounted on the photo rig to perform photography, and in such photo rig, inclination of the camera may be adjusted.

However, with increasing demands of photography, the conventional photo rig may also have to evolve as per the latest requirement of the photographers. Examples of conventional photo rig may be readily available in the market, however, such conventional available photo rigs may be suitable for their respective purposes but may lack certain features, for example, adaptability of photo rig in various environment of photography, including constrained environment or spacious environment, orientation of mounting plate of the camera, inclination of camera at all angles. Conventional photo rigs have a two-dimensional control structure wherein a desired angle is achieved by the operation of horizontal controlling means and vertical controlling means. However, such operation is complicated from user perspective.

Accordingly, there exist a need to provide a photo rig assembly that may provide adaptability of a photo rig in various environment of photography, including compact environment or spacious environment. There may also exists a need to provide such photo rig that may provide a stable level of camera with multiple inclination angles, that may not obstruct the work area.

SUMMARY OF THE DISCLOSURE

In view of the foregoing disadvantages inherent in the prior art, the general purpose of the present disclosure is to provide a photo studio rig assembly, to offer improvements upon the drawbacks inherent in the prior art.

An object of the present disclosure is to provide a photo studio rig assembly that may provide adaptability of a photo rig in various environment of photography, including compact environment or spacious environment, for example, a photo studio rig assembly that may expand or contract according to small or large surface areas where such photo studio rig assembly is being used.

Another object of the present disclosure is to provide a photo studio rig assembly having various clamping attachments, such as clamping assembly members, which can be used to affix and create background/backdrops and a desired decorative environment for photography, videography, and the like.

Another object of the present disclosure is to provide a photo studio rig assembly having various gear attachments, such as gear assembly members, for providing suitable attachment points for camera or phone for photography, videography, and the like.

Yet another object of the present disclosure is to provide a photo studio rig assembly that clear photographic environment without obstruction of a work area during photography, videography, and the like.

In light of the above, in one aspect of the present disclosure, a photo studio rig assembly is provided. The photo rig assembly includes a photography accessory holding assembly, and a pair of vertically extending support member detachably coupled to the photography accessory holding assembly. The photography accessory holding assembly includes a longitudinally extending horizontal assembly member, one or more gear assembly member, and one or more clamping assembly member. The longitudinally extending horizontal assembly member may be adapted to expand and contract. The pair of vertically extending support member is spaced apart from each other to be detachably coupled to the longitudinally extending horizontal assembly member. The one or more gear assembly member and the one or more clamping assembly member may be detachably and adjustably coupled to the longitudinally extending horizontal assembly member.

In one embodiment, the longitudinally extending horizontal assembly member may include an elongated inner rod member, and at least two hollow outer rod members slidably received over the elongated inner rod member to be slid over the elongated inner rod member to expand and contract the longitudinally extending horizontal assembly member.

In one embodiment, the elongated inner rod member may include an etched distance marker to measure length of the longitudinally extending horizontal assembly.

In one embodiment, the elongated inner rod member may include at least one slot across a length of the elongated inner rod member allowing it to slide and engage with both the mounting plate tightening knob and a sliding member tightening knob to slidably couple the one or more gear assembly members to the elongated inner rod member.

In one embodiment, each of the at least two hollow outer rod members includes a first end portion and a second end portion. The first portion end portion may include a locking knob to loosen or tighten the each of the at least two hollow outer rod members with respect to the elongated inner rod member to increase or decrease length of the longitudinally extending horizontal assembly member for expansion and contraction. Each of the second end portion is coupled to the pair of vertically extending support member.

In one embodiment, the pair of vertically extending support member may include a height-adjustable tripod or flat leg configuration.

In one embodiment, the one or more clamping assembly includes a first member, a second member and a clamp gripping member. The first member is slidably coupled over a hollow outer rod member of the at least two hollow outer rod members. Further, the second member is coupled to the first member and laterally extends from the first member. The clamp gripping member includes a first end portion and a second end portion. The clamp gripping member is coupled to the second member from the first end portion and from the second end portion the clamp gripping member is adapted to clamp a required object.

In one embodiment, the clamp gripping member is adjustably coupled to a plurality of orientation including horizontal position or vertical position.

In one embodiment, the one or more clamping assembly member further includes a first tightening knob and a second tightening knob. The first tightening knob is adjustably coupled to the first member and the second member. The second tightening knob is adjustably coupled to the first member to the hollow outer rod member of the at least two hollow rod members to slidably couple the first member, the second member, and the first tightening knob to the hollow rod member of the at least two hollow outer rod members.

In one example embodiment, the one or more gear of the gear assembly member may be a camera mount member. The camera mount member includes a mounting plate, a gear mount member, a pivoting member, and a handle. The mounting plate is slidably coupled to the elongated inner rod member. The gear mount member is pivotally coupled to the mounting plate. The pivoting member is pivotally coupled to the mounting member and the gear mount member. The handle that extends from the pivoting member is used to orient the gear mount member at a plurality of angles.

In one embodiment, the camera mount member further includes a mounting plate tightening knob to slidably couple the mounting plate to the elongated inner rod member. The mounting plate tightening knob engages with at least one slot extending across the length of the elongated inner rod member to slidably couple the mounting plate to the elongated inner rod member.

In one example embodiment, the photography accessory holding assembly may further includes a phone mount member adapted to be detachably coupled to the camera mount member. The phone mount member may include an attachment member, an extending member, and a phone attaching member. In an example arrangement, the attachment member adapted to be detachably coupled to the gear mount member of the camera mount member. Further, the extending member extends from the attachment member. The phone attaching member may be coupled to the extending member to attach a phone parallelly aligned to the extending member. The extending member and phone attaching member may be perpendicular to each other. The phone mount member may further include an attachment member tightening knob to couple the attachment member to the gear mount member of the camera mount member.

In one embodiment, the photo studio rig assembly further includes a light mount assembly that is coupled to the hollow outer rod members.

In one arrangement of the present disclosure, the photography accessory holding assembly may include a bubble level indicator to indicate whether or not the photography accessory holding assembly is oriented horizontally.

In light of the above, in another aspect of the present disclosure, a photography accessory holding assembly is disclosed herein. The photography accessory holding assembly includes a longitudinally extending horizontal assembly member one or more clamping assembly member, and one or more gear assembly member. The longitudinally extending horizontal assembly member includes an elongated inner rod member and at least two hollow outer rod members. The elongated inner rod member includes at least one slot extending across a length of the elongated inner rod member. The longitudinally extending horizontal assembly member may be adapted to expand and contract. The one or more clamping assembly member may be adjustably coupled to the longitudinally extending horizontal assembly member. The one or more gear assembly member may be adjustably coupled to the elongated inner rod member of the longitudinally extending horizontal assembly.

These elements, together with the other aspects of the present disclosure and various features are pointed out with particularity in the claims annexed hereto and form a part of the present disclosure. For a better understanding of the present disclosure, its operating advantages, and the specified object attained by its uses, reference should be made to the accompanying drawings and descriptive matter in which there are illustrated exemplary embodiments of the present disclosure.

BRIEF DESCRIPTION OF THE DRAWINGS

The advantages and features of the present disclosure will become better understood with reference to the following detailed description taken in conjunction with the accompanying drawing, in which.

Like reference, numerals refer to like parts throughout the description of several views of the drawing.

DETAILED DESCRIPTION OF THE DISCLOSURE

The following provides a detailed description of embodiments of the disclosure as depicted in the accompanying drawings. The embodiments are in such detail as to communicate the disclosure. However, the amount of detail offered is not intended to limit the anticipated variations of embodiments; on the contrary, the intention is to cover all modifications, equivalents, and alternatives falling within the spirit and scope of the present disclosure.

In the following description, numerous specific details are set forth in order to provide a thorough understanding of the embodiments of the present disclosure. It may be apparent to one skilled in the art that embodiments of the present disclosure may be practiced without some of these specific details.

Various terms as used herein are shown below. To the extent a term is used, it should be given the broadest definition persons in the pertinent art have given that term as reflected in printed publications and issued patents at the time of filing.

The terms "a" and "an" herein do not denote a limitation of quantity, but rather denote the presence of at least one of the referenced items.

The terms "having". "comprising". "including", and variations thereof signify the presence of a component.

Figure 1:
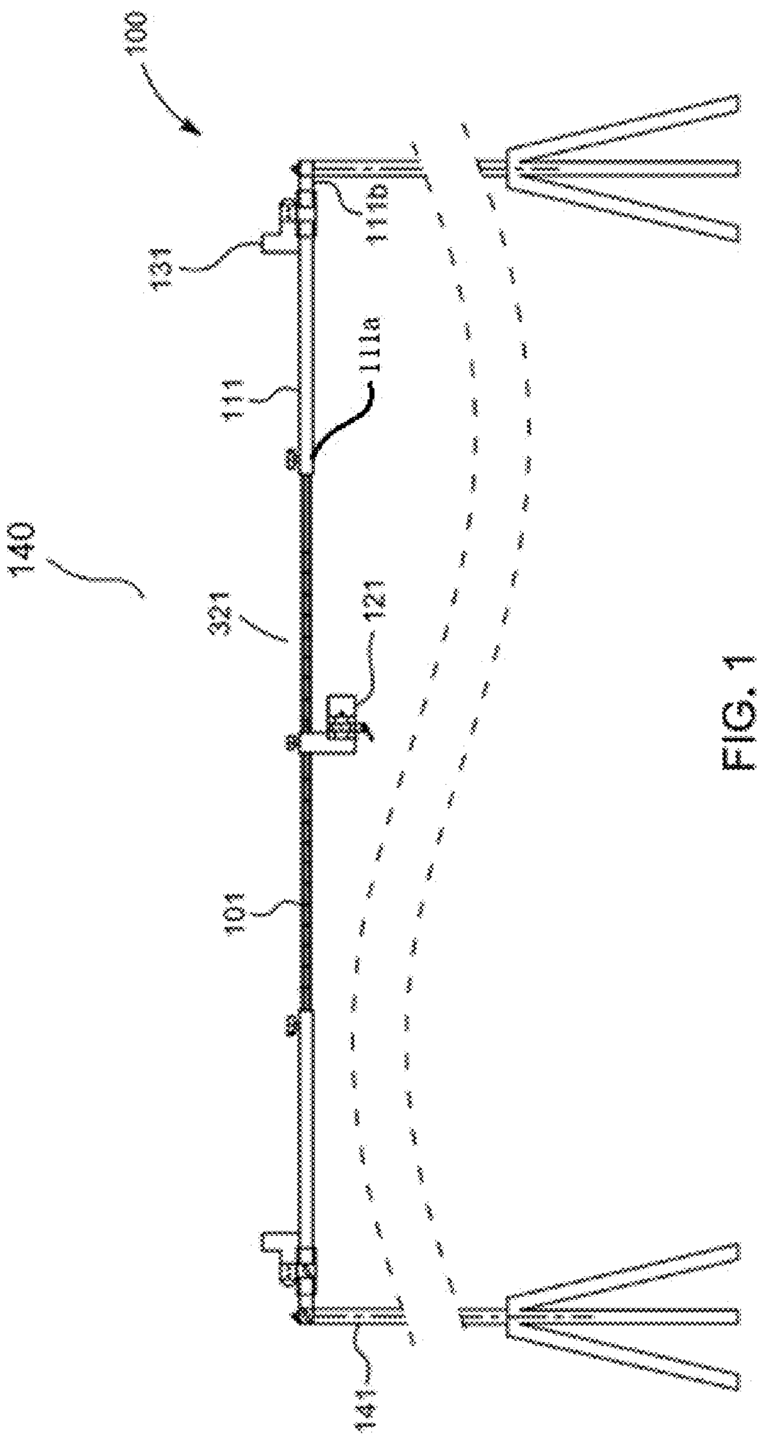
FIG. 1 illustrates a schematic view of a photo studio rig assembly, in accordance with an exemplary embodiment of the present disclosure.

Referring now to FIG. 1 to FIG. 4 to describe various exemplary embodiments of the present disclosure. FIG. 1 illustrates a schematic view of a photo studio rig assembly 100, in accordance with an exemplary embodiment of the present disclosure. As seen, the photo studio rig assembly 100 includes a photography accessory holding assembly 140, and a pair of vertically extending support member 141 may be attached thereto upon requirement, as will be described herein later. The photography accessory holding assembly 140 includes a longitudinally extending horizontal assembly member 321, one or more gear assembly members 121, and one or more clamping assembly members 131.

The longitudinally extending horizontal assembly member 321 is adapted to expand or contract. Further, the longitudinally extending horizontal assembly member 321 includes an elongated inner rod member 101 and at least two hollow outer rod members 111. The two hollow outer rod members 111 is slidably received over the elongated inner rod member 101 to be slid over the elongated inner rod member 101 to expand and contract the longitudinally extending horizontal assembly member 321. Further, the pair of vertically extending support member 141 is spaced apart from each other to be coupled to the longitudinally extending horizontal assembly member 321. Furthermore, the one or more gear assembly members 121 is adjustably coupled to the elongated inner rod member 101 of the longitudinally extending horizontal assembly member 321, and the one or more clamping assembly members 131 is adjustably coupled to the at least two hollow outer rod members 11I of the longitudinally extending horizontal assembly member 321.

The shape of the elongated inner rod member 101 and hollow outer rod members 111 may include square. However, without departing from the scope of the present disclosure, the shape of the elongated inner rod member 101 and the hollow outer rod member 111 may, include, but not limited to be circular, or elliptical.

Figure 4:
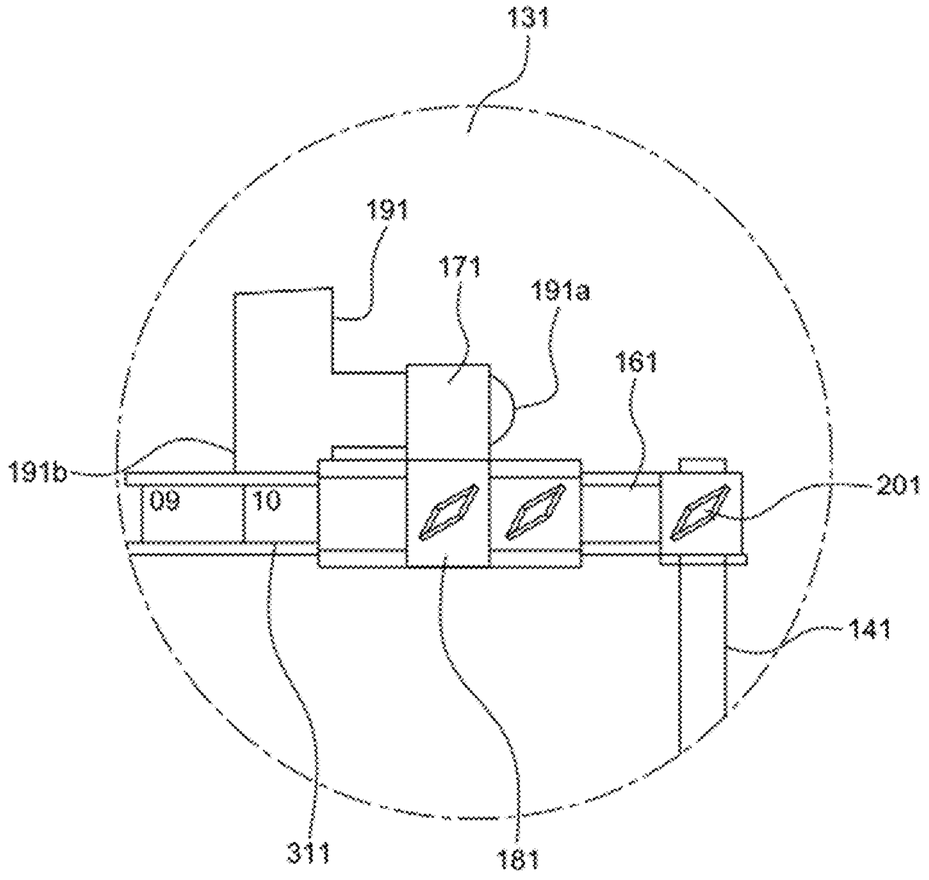
FIG. 4 illustrates a clamping assembly member of the photo studio rig assembly, in accordance with an exemplary embodiment of the present disclosure.

In one example illustration, as seen in FIG. 4, the elongated inner rod member 101 may include an etched distance marker 311 to measure length of the longitudinally extending horizontal assembly 321. More specifically, such etched distance marker 311 provides a measurement of expansion and contraction of the two hollow rod members 111 over the elongated inner rod member 101 to adjust the longitudinally extending horizontal assembly member 321 according to compact environment or spacious environment, for example, the photo studio rig assembly 100 that may expand or contract according to small or large surface areas where such photo studio rig assembly is being used.

In one example illustration, the elongated inner rod member 101 comprises at least one slot 401 across a length of the elongated inner rod member 101 to slidably engage with a mounting plate tightening knob 251 and a sliding member tightening knob 281*a* to slidably couple the one or more gear assembly members to the elongated inner rod member 101.

Each of the at least two hollow outer rod members 111 includes a first end portion 111*a* and a second end portion 111*b*. Each of the first end portion 111*a* may include a locking knob to loosen or tighten the each of the at least two hollow outer rod members 111 with respect to the elongated inner rod member 101 to increase or decrease the length of the longitudinally extending horizontal assembly member 321 to expand and contract thereto. Each of the second end portion 111*b* is coupled to the pair of vertically extending support member 141 upon requirement.

The pair of vertically extending support member 141 may include a height-adjustable tripod or flat leg configuration as seen in FIG. 1. However, without departing from the scope of the present disclosure, the pair of vertically extending support member may include any other structure that may extend vertically to increase or decrease the height of the photo studio rig assembly 100. The photography accessory holding assembly 140 is an independent product which may or may not be sold with the pair of vertically extending support member to the user. The idea of providing the pair of vertically extending support member 141 is to provide a stand-like structure where the photography accessory holding assembly 140 may be supported to be aligned at height from the ground, and that the structure of the pair of vertically extending support member 141 is not intended to be limited to what is disclosed herein. Any vertical structure, including, but not limited to light stands or c-stands, or any other vertical supports, may be used in the future. Further, the future 'legs' that will vertically extend, might not be a tripod format, as seen, they may be in a flat format.

Figure 3A:
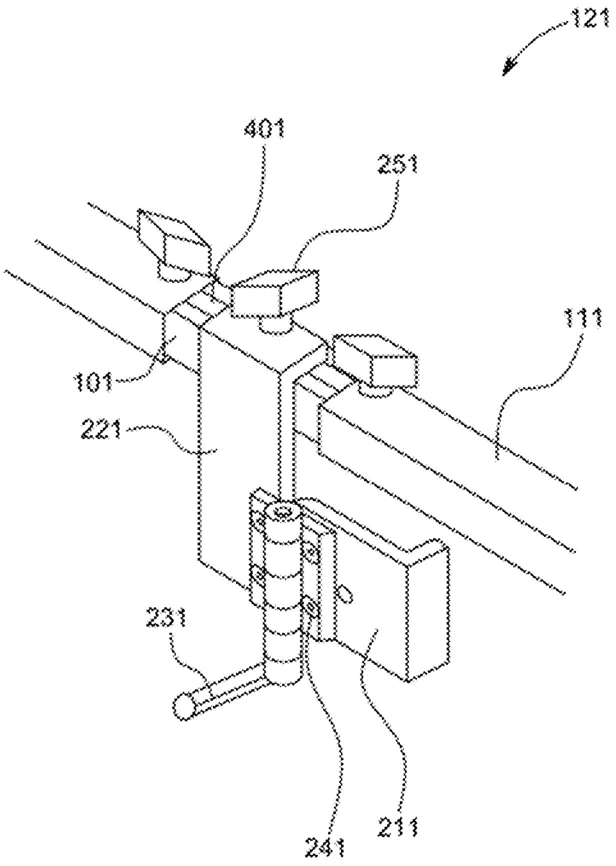
FIG. 3A illustrates a gear assembly member as a camera mount member of the photo studio rig assembly, in accordance with an exemplary embodiment of the present disclosure.

The one or more gear assembly member 121 may be a camera mount member (also referenced as numeral '121'), as seen in FIG. 3A; that may be mounted with the elongated inner rod member 101. Further, there may also be a phone mount member 300, as seen in FIG. 3B, adapted to be detachably coupled to the camera mount member 121, to attach a phone.

Referring specifically to FIG. 3A, as seen, the camera mount member 121 may include a mounting plate tightening knob 251, a mounting plate 221, a gear mount member 211, a pivoting member 241 and a handle 231. The mounting plate tightening knob 251 engages with at least one slot 401 extending across the length of the elongated inner rod member 101 to slidably couple the mounting plate 221 to the elongated inner rod member 101. The mounting plate 221 is slidably coupled to the elongated inner rod member 101 with the help of the mounting plate tightening knob 251. Further, the gear mount member 211 is pivotally coupled to the mounting plate 221. The pivoting member 241 is arranged to pivotally couple the mounting plate 221 and the gear mount member 211 and the handle extends from the pivoting member 241 to orient the gear mount member 211 at a plurality of angles. The camera may be mounted to the gear mount member 211 on its reverse side via a conventional camera mount assembly 500, as seen in example FIG. 5A, opposite to a side on which the pivoting member 241 is provided to couple the gear mount member 211 with the mounting plate 221. As seen in example FIG. 5A, the conventional camera mount assembly 500 may include male 501 and female 502 parts, wherein the female part 502 is coupled to the gear mount member 211, and the male part 501 is screwed into a bottom of the camera. When the two pieces (male and female) come together, the camera "A" is firmly mounted on the gear mount member 211 of the camera mount member 121. However, without departing from the scope of the present disclosure, the camera may be mounted to the gear mount member 211 on its reverse side via any other conventional camera mount assembly, apart from what is it disclosed in FIG. 5A.

In one example, the mounting plate tightening knob 251 may include, but not limited, to a nut and bolt assembly, a tightening screw assembly. The mounting plate tightening knob 251 may be tighten or loosen over the elongated inner rod member 101 at desired location along the etched distance marker 311 to fix and adjust the camera mount member.

Figure 3B:
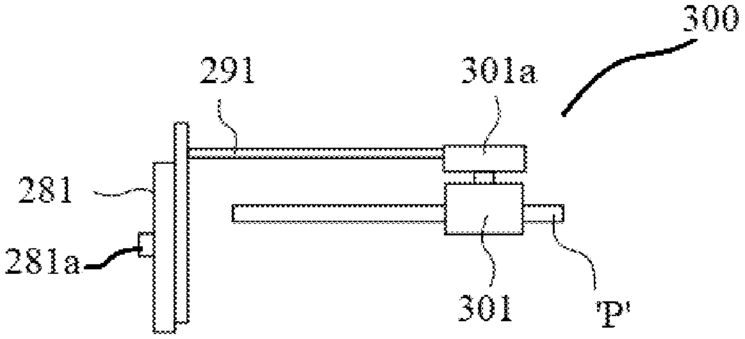
FIG. 3B illustrates a phone mount member of the photo studio rig assembly, in accordance with an exemplary embodiment of the present disclosure.

Referring to FIG. 3B, in further embodiment, the photography accessory holding assembly 140 may include a phone mount member 300 adapted to be detachably coupled to the camera mount member 121. In one example arrangement, the phone mount member 300 may be coupled to the gear mount member 211 to provide the user with a choice to attach a phone 'P' to take photos or shoot videos. The phone mount member 300 may be mounted to the gear mount member 211 on its reverse side, opposite to a side on which the pivoting member 241 is provided to couple the gear mount member 211 with the mounting plate 221. The phone mount member 300 may include an attachment member 281, an extending member 291, and a phone attaching member 301. In an example arrangement, the attachment member 281 adapted to be detachably coupled to the gear mount member 211 of the camera mount member 121. Further, the extending member 291 extends from the attachment member 281. The phone attaching member 301 may be coupled to the extending member 291 via a coupling 301*a* to attach a phone 'P' parallelly aligned to the extending member 291. The extending member 291 and phone attaching member 301 may be perpendicular to each other. The phone mount member 300 may further include an attachment member tightening knob 281*a* to couple the attachment member to the gear mount member 211 of the camera mount member 121.

Referring to FIG. 4, the one or more clamping assembly member 131 includes a first member 161, a second member 171 and a clamp gripping member 191. The first member 161 is slidably coupled over a hollow outer rod member of the at least two hollow outer rod members 111. The second member 171 is coupled to the first member 161 and laterally extends from the first member 161. The clamp gripping member 191 includes a first end portion 191*a* and a second end portion 191*b*. The clamp gripping member 191 is coupled to the second member 171 from the first end portion 191*a* and is adapted to clamp a required object from the second end portion 191*b*.

In one embodiment, the clamp gripping member 191 is adjustably coupled to a plurality of orientation including horizontal position or vertical position.

In one embodiment, the one or more clamping assembly member 131 further includes a first tightening knob 181 and a second tightening knob 201. The first tightening knob 181 adjustably couples the first member 161 and the second member 171. The second tightening knob 201 adjustably couples the first member 161 to the hollow outer rod member of the at least two hollow rod members 111 to slidably couple the first member 161, the second member 171 and the first tightening knob 181 on the hollow rod member of the at least two hollow rod members 111. The first tightening knob 181 and the second tightening knob 201 may include, but not limited, to a nut and bolt assembly, a tightening screw assembly. The first tightening knob 181 and the second tightening knob 201 may be used for tighten or loosen the specified members to provide adaptability of the photo studio rig assembly in various environment of photography, including compact environment or spacious environment.

Figure 2:
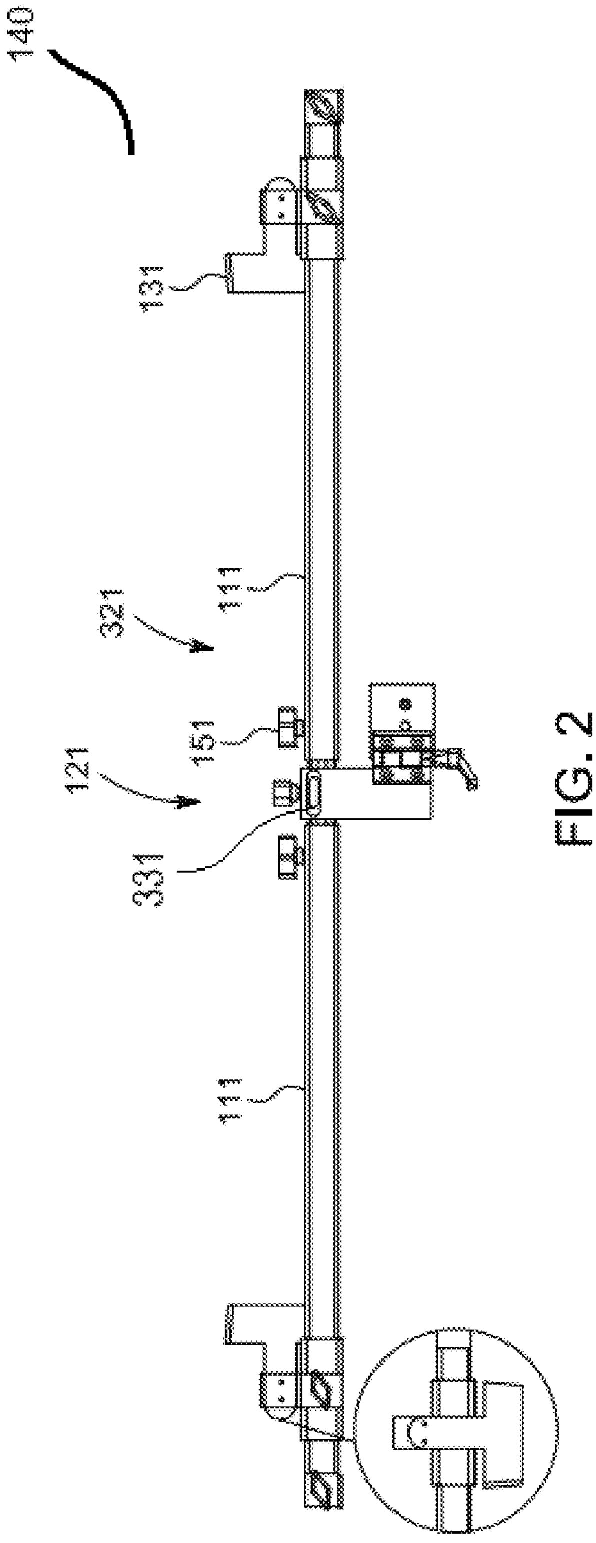
FIG. 2 illustrates a schematic view of the photo studio rig assembly without the vertically extending support member, in accordance with an exemplary embodiment of the present disclosure.

In one embodiment, the photo studio rig assembly 100 further includes a bubble level indicator 331, as shown in FIG. 2, to indicate whether or not the photography accessory holding assembly 140 is in horizontal orientation. In one example arrangement, the bubble level indicator 331 may be provided with the one or more gear assembly member 121, as seen in FIG. 2.

Figure 5:
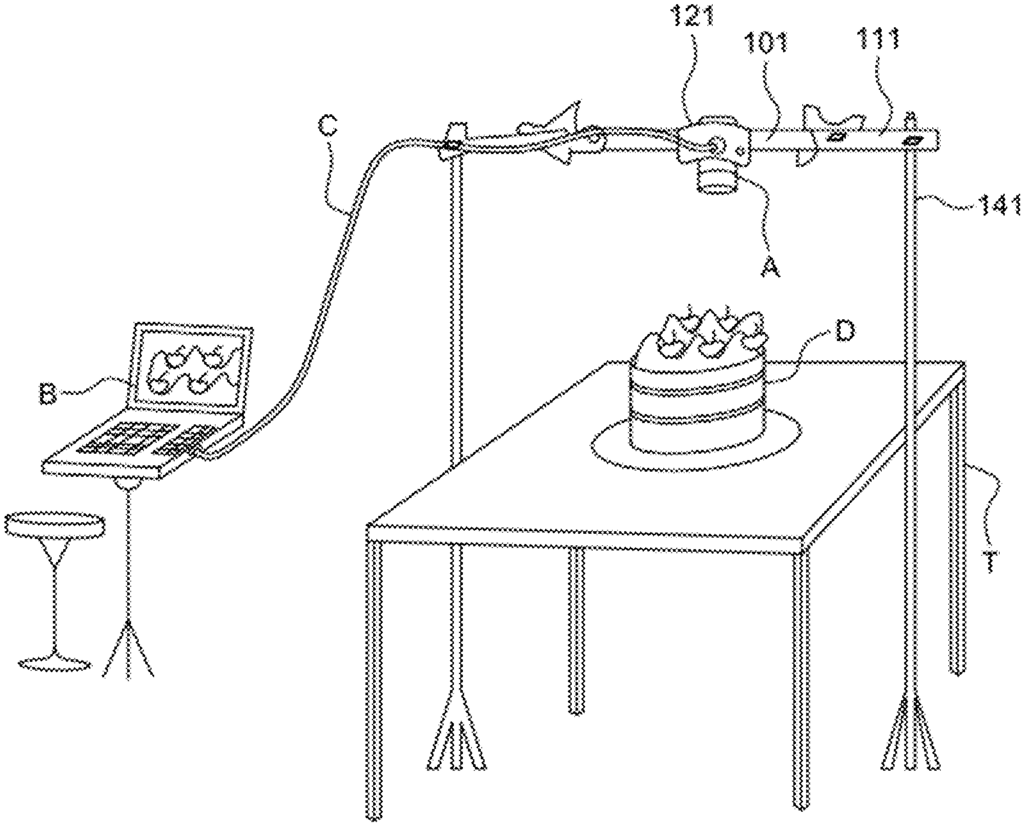
FIG. 5 illustrates a first embodiment of the photo studio rig assembly, in accordance with an exemplary embodiment of the present disclosure.
Figure 5A:
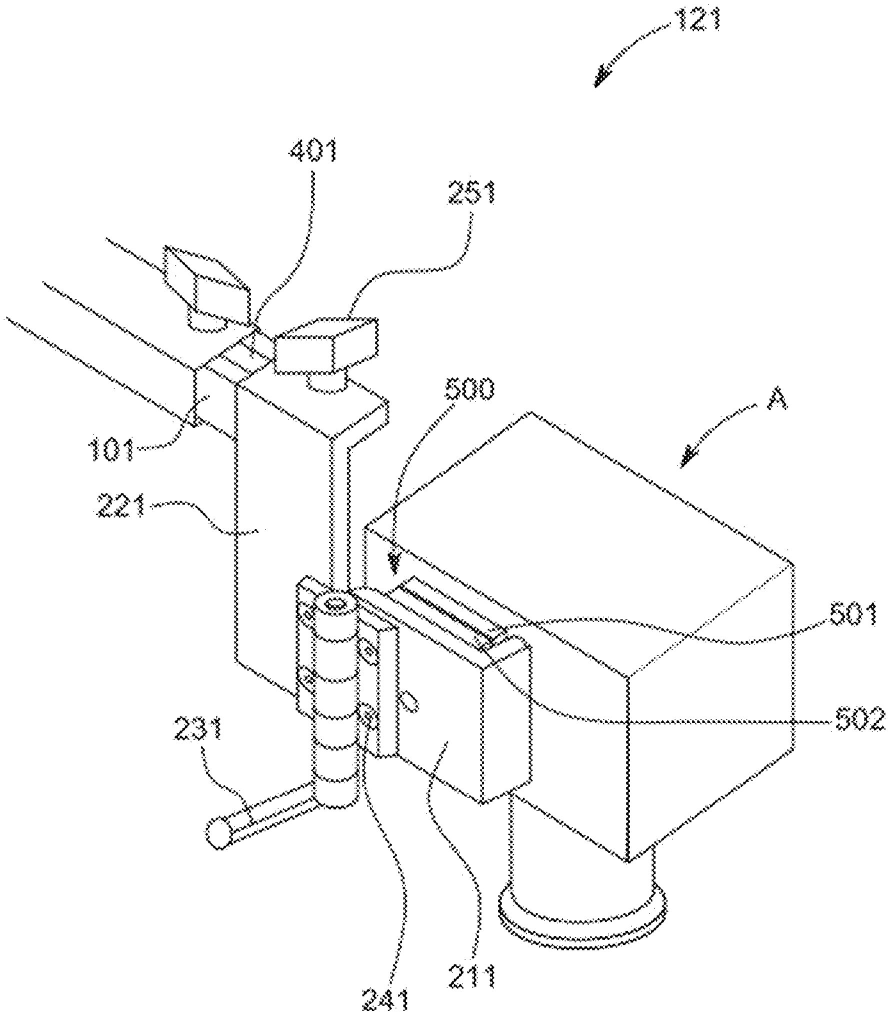
FIG. 5A illustrates a camera mounted on a gear mount member of the camera mount member using conventional camera mount assembly, in accordance with an exemplary embodiment of the present disclosure.

Referring to FIGS. 5 and 5A, the first embodiment of the photo studio rig assembly 100 is disclosed herein. A photo studio rog assembly 100 including the photography accessory holding assembly 140 and the pair of vertically extending support member 141, is placed on the floor such that a table "T" lies between the pair of vertically extending support member 141, and the longitudinally extending horizontal assembly member 321 lies above the table "T" In this embodiment, the gear assembly member 121 may be in use, and that such gear assembly member 121 may be mounted on the elongated inner rod member 101 of the longitudinally extending horizontal assembly member 321. In further embodiment, the gear assembly member 121 may be in use, and that such gear assembly member 121 may be slidably and integrally provided on the elongated inner rod member 101 of the longitudinally extending horizontal assembly member 321. The gear assembly member 121 disclosed here is a camera mount member. A camera "A" is mounted on the camera mount member via the conventional camera mount assembly 500, as described above in reference to FIG. 5A. The camera "A" is mounted on the camera mount member such that the camera "A" is positioned just above a cake "C" placed on the table "T". The camera "A" is fixed to an information processing device "B" through a USB cable "C". The USB cable "C" may be wound around the knobs to fit to the camera slot. The USB cable "C" may be wound around the knobs to keep the USB cable tidy. The camera "A" is configured to capture images of the cake "D" set on the table "T" and the information processing device "B" is configured to process the images sent by the camera "A". For the stable set of images, the camera "A" should be mounted properly on the gear assembly member 121. For mounting the camera "A" on the gear assembly member 121, the conventional camera mount assembly 500 may be used which couples the camera "A" to the gear assembly member 121. Further, one or more gear assembly member 121 is slidable on the elongated inner rod member 101. Furthermore, the longitudinal extending horizontal assembly member 321 may be adapted to expand and contract so not to obstruct the working area, and to provide adaptability of the photo studio rig assembly in various environment of photography, including compact environment or spacious environment.

Figure 6:
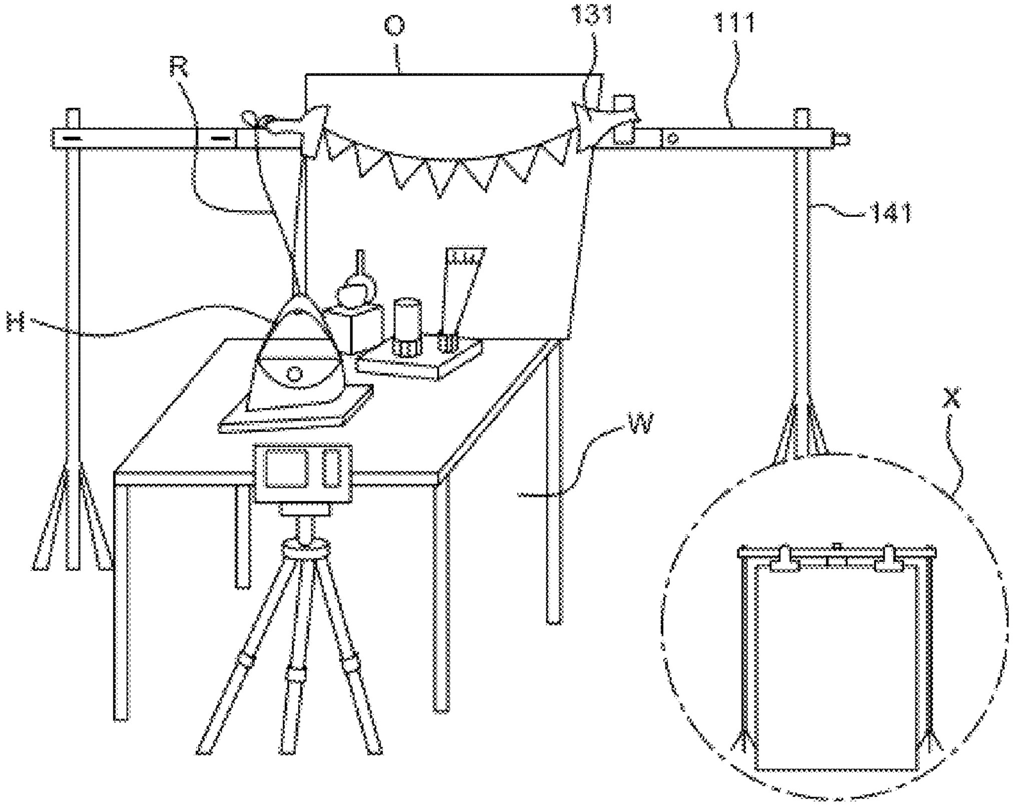
FIG. 6 illustrates a second embodiment of the photo studio rig assembly, in accordance with one or more exemplary embodiments of the present disclosure.
Figure 6A:
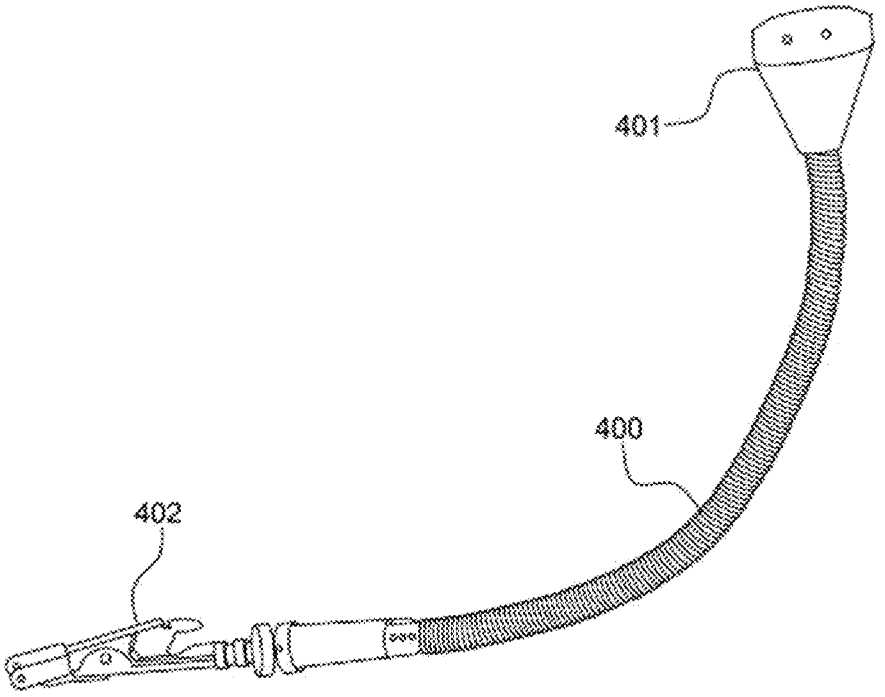
FIG. 6A illustrates a flexible metal piece that is adapted to be held on the gear assembly member, in accordance with one or more exemplary embodiments of the present disclosure.

Referring to FIG. 6, the second embodiment of the photo studio rig assembly 100 is disclosed herein. The photo studio rig assembly 100 that includes the photography accessory holding assembly 140 and the pair of vertically extending support member 141, is placed on the floor. In this embodiment, the photo studio rig assembly 100 includes the photography accessory holding assembly 140 having the longitudinally extending horizontal assembly member 321 and the clamping assembly member 131. The photo studio rig assembly 100 is placed on the floor such that a table "T" is placed between the pair of vertically extending support member, and the longitudinally extending horizontal assembly member lies above the table "T" in spaced manner. The clamping assembly member 131 is configured to clamp the required object "O" such that the object "O" lies on the table "T" behind the targeted subject to be photographed or for videography. The object 'O' may be a board. The clamping assembly member 131 is also configured to support rigging for product positioning such as holding handbag handles "H". The rigging is supported using a rope or a cable "R" or a flexible metal piece 400, as seen in FIG. 6A, that is held on the gear assembly member 121 by a magnetic base 401 at one end thereof, and also includes a grip clamp 402 at the other end. The longitudinal extending horizontal assembly member 321 may be adapted to expand and contract so not to obstruct the working area "W" and to provide adaptability of the photo studio rig assembly 100 in various environment of photography, including compact environment or spacious environment. The one or more clamping assembly member 131 rotates in horizontal position or vertical position. The horizontal position as shown when the clamping assembly member 131 holds or clamps the object "O". The vertical position is shown in encircled portion "X" where the clamping assembly member 131 clamps the paper roll or fabric backgrounds. The one or more clamping assembly member 131 may also be used to add other attachments like lighting, screens etc. to the photo studio rig assembly 100.

The photo rig assembly of the present disclosure is advantageous to provide a photo studio rig assembly that may provide adaptability of a photo rig in various environment of photography, including compact environment or spacious environment, for example, a photo studio rig assembly that may expand or contract according to small or large surface areas where such photo studio rig assembly is being used. Further, the photo rig assembly of the present disclosure may be used in various environment of photography, or for decorating and then photography as per requirement of various environment. The photo rig assembly of the present disclosure is also advantageous in providing various clamping attachments, such as clamping assembly members, that may be used to attach decorative items to create a desired decorative environment for photography. The photo rig assembly of the present disclosure is also advantageous in providing various gear attachments, such as gear assembly members, to provide suitable attachment points for camera or phone for photography. The photo rig assembly of the present disclosure is also advantageous in providing a photo studio rig assembly that clear photographic environment without obstruction of a work area during photography.

The foregoing descriptions of specific embodiments of the present disclosure have been presented for purposes of illustration and description. They are not intended to be exhaustive or to limit the present disclosure to the precise forms disclosed, and many modifications and variations are possible in light of the above teaching. The embodiments were chosen and described to best explain the principles of the present disclosure and its practical application, and to thereby enable others skilled in the art to best utilize the present disclosure and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the scope of the present disclosure.

What is claimed is:

1. A photo studio rig assembly comprising:
a photography accessory holding assembly having,
a longitudinally extending horizontal assembly member adapted to expand and contract, the longitudinally extending horizontal assembly member comprising:
an elongated inner rod member,
at least two hollow outer rod members slidably received over the elongated inner rod member to be slid over the elongated inner rod member to expand and contract the longitudinally extending horizontal assembly member,
one or more gear assembly members adjustably coupled to the elongated inner rod member of the longitudinally extending horizontal assembly member, and
one or more clamping assembly members adjustably coupled to the at least two hollow outer rod members of the longitudinally extending horizontal assembly member;
a pair of vertically extending support members spaced apart from each other and coupled to distal end portions of the longitudinally extending horizontal assembly member; and
wherein one or more of the gear assembly member(s) is a camera mount member, wherein the camera mount member comprises:
a mounting plate slidably coupled the elongated inner rod member;
a gear mount member pivotally coupled to the mounting plate;
a pivoting member pivotally coupling the mounting plate and the gear mount member; and
a handle extending from the pivoting member to orient the gear mount member at a plurality of angles.

2. The photo studio rig assembly as claimed in claim 1, wherein the elongated inner rod member comprises:
an etched distance marker to measure length of the longitudinally extending horizontal assembly; and
at least one slot across a length of the elongated inner rod member to slidably engage with a mounting plate tightening knob and a sliding member tightening knob to slidably couple the one or more gear assembly members to the elongated inner rod member.

3. The photo studio rig assembly as claimed in claim 1, wherein:
each of the at least two hollow outer rod members comprises a first end portion and a second end portion,
each of the first end portion comprises a locking knob to loosen or tighten the each of the at least two hollow outer rod members with respect to the elongated inner rod member to increase or decrease length of the longitudinally extending horizontal assembly member to expand and contract thereto,
each of the second end portion is coupled to the pair of vertically extending support member.

4. The photo studio rig assembly as claimed in claim 1, wherein the pair of vertically extending support member comprises a height-adjustable tripod configuration.

5. The photo studio rig assembly as claimed in claim 1, wherein one or more of the clamping assembly members comprises:
a first member to slidably coupled over a hollow outer rod member of the at least two hollow outer rod members;
a second member coupled to the first member and laterally extends from the first member;
a clamp gripping member having a first end portion, and a second end portion, wherein the clamp gripping member is coupled to the second member from the first end portion, and wherein the clamp gripping member, from the second end portion, is adapted to clamp a required object.

6. The photo studio rig assembly as claimed in claim 5, wherein the clamp gripping member is adjustably coupled to a plurality of orientation including horizontal position or vertical position.

7. The photo studio rig assembly as claimed in claim 5, wherein one or more of the clamping assembly members further comprises:

a first tightening knob adjustably couple the first member and the second member;

a second tightening knob adjustably couple the first member to the hollow outer rod member of the at least two hollow outer rod members to slidably couple the first member, the second member, and the first tightening knob on the hollow outer rod member of the at least two hollow rod members.

8. The photo studio rig assembly as claimed in claim 1, wherein the camera mount member further comprises: a mounting plate tightening knob to slidably couple the mounting plate to the elongated inner rod member, wherein the mounting plate tightening knob engages with at least one slot extending across the length of the elongated inner rod member to slidably couple the mounting plate to the elongated inner rod member.

9. The photo studio rig assembly as claimed in claim 1, further comprising a phone mount member adapted to be detachably coupled to the camera mount member, wherein the phone mount member comprises: an attachment member adapted to be detachably coupled to the gear mount member of the camera mount member; an extending member extends from the attachment member; a phone attaching member coupled to the extending member to attach a phone parallelly aligned to the extending member; and the extending member and phone attaching member are perpendicularly aligned to each other.

10. The photo studio rig assembly as claimed in claim 9, wherein the phone mount member further comprises:

an attachment member tightening knob to couple the mounting member to the gear mount member of the camera mount member.

11. The photo studio rig assembly as claimed in claim 1 further comprising a bubble level indicator to indicate whether or not the photography accessory holding assembly is in horizontal orientation.

12. A photography accessory holding assembly comprising:

a longitudinally extending horizontal assembly member adapted to expand and contract, the longitudinally extending horizontal assembly member comprising:

an elongated inner rod member, wherein the elongated inner rod member comprises at least one slot extending across a length of the elongated inner rod member;

at least two hollow outer rod members slidably received over the elongated inner rod member to be slid over the elongated inner rod member to expand and contract longitudinally extending horizontal assembly member;

one or more gear assembly members adjustably coupled to the elongated inner rod member of the longitudinally extending horizontal assembly;

one or more clamping assembly members adjustably coupled to the at least two hollow rod members of the longitudinally extending horizontal assembly member; and wherein one or more of the gear assembly member(s) is a camera mount member, wherein the camera mount member comprises:

a mounting plate slidably coupled the elongated inner rod member;

a gear mount member pivotally coupled to the mounting plate;

a pivoting member pivotally coupling the mounting member and the gear mount member; and a handle extending from the pivoting member to orient the gear mount member at a plurality of angles.

13. The photography accessory holding assembly as claimed in claim 12, wherein the camera mount member further comprises: a mounting plate tightening knob to slidably couple the mounting plate to the elongated inner rod member, wherein the mounting plate tightening knob engages with the at least one slot extending across the length of the elongated inner rod member to slidably couple the mounting plate to the elongated inner rod member.

14. The photography accessory holding assembly as claimed in claim 12, further comprising a phone mount member adapted to be detachably coupled to the camera mount member, wherein the phone mount member comprises: an attachment member adapted to be detachably coupled to the gear mount member of the camera mount member; an extending member extends from the attachment member; a phone attaching member coupled to the extending member to attach a phone parallelly aligned to the extending member; and the extending member and phone attaching member are perpendicularly aligned to each other.

15. The photography accessory holding assembly as claimed in claim 14, wherein the phone mount member further comprises:

an attachment member tightening knob to couple the attachment member to the gear mount member of the camera mount member.

16. The photography accessory holding assembly as claimed in claim 12, wherein the one or more clamping assembly member comprises:

a first member to slidably coupled over a hollow outer rod member of the at least two hollow rod members;

a second member coupled to the first member and laterally extends from the first member;

a clamp gripping member having a first end portion, and a second end portion, wherein the clamp gripping member is coupled to the second member from the first end portion, and wherein the clamp gripping member, from the second end portion, is adapted to clamp a required object.

17. The photography accessory holding assembly as claimed in claim 16, wherein one or more of the clamping assembly members further comprises:

a first tightening knob adjustably couple the first member and the second member;

a second tightening knob adjustably couple the first member to the hollow outer rod member of the at least two hollow outer rod members to slidably couple the first member, the second member, and the first tightening knob on the hollow outer rod member of the at least two hollow outer rod members.

* * * * *